Figure 1:
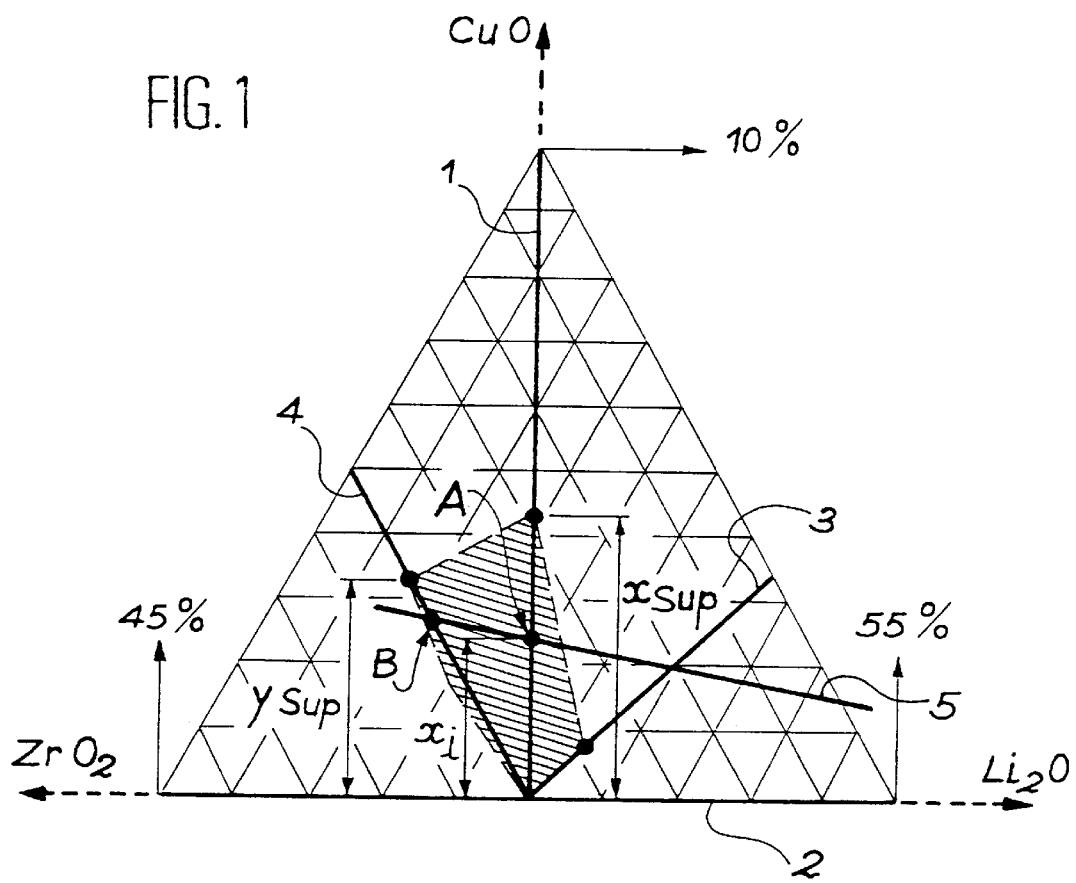

United States Patent [19]

Abraham et al.

[11] Patent Number: 5,834,390
[45] Date of Patent: Nov. 10, 1998

[54] COPPER-SUBSTITUTED, LITHIUM ZIRCONATE-BASED CERAMIC USABLE AS A TRITIUM PRODUCING MATERIAL

[75] Inventors: Francis Abraham, Rue de la Libération; Pierre Blouet, Paris; Jean-Claude Boivin, Wattrelous; Marcel Boncoeur, Paris; Bernard Rasneur, Le mesnil St Denis; Nicole Roux, Paris, all of France

[73] Assignee: Commissariat A L'Energie Atomique, Paris, France

[21] Appl. No.: 911,985

[22] Filed: Aug. 15, 1997

Related U.S. Application Data

[63] Continuation of Ser. No. 637,411, Apr. 24, 1996, abandoned.

[30] Foreign Application Priority Data

May 11, 1992 [FR] France .................................. 95 05582

[51] Int. Cl.⁶ .................................................. C04B 35/48
[52] U.S. Cl. ............................................ 501/134; 423/593
[58] Field of Search .............................. 501/134; 423/593

[56] References Cited

U.S. PATENT DOCUMENTS 4,933,155  6/1990  Nagata et al. ........................... 423/593

FOREIGN PATENT DOCUMENTS 2 227 740  8/1990  United Kingdom .

OTHER PUBLICATIONS

Castellanos, et al., New Family of Phases, $Li_2MXO_4$: X=Mg, Mn, Fe, Co, Ni, Cu, Zn With $_x$–$LiFeO_2$ and Related Structures, *Zeitschrift für Kristallographie*—vol. 190 (3–4), pp. 161–169 (1990).

*Primary Examiner*—Melissa Bonner
*Attorney, Agent, or Firm*—Burns, Doane, Swecker & Mathis, LLP

[57] ABSTRACT

The invention relates to ceramic materials usable as tritium producing material in a thermonuclear fusion reactor. These materials are constituted by lithium zirconate substituted by copper in the form of solid solutions of the type $Li_2ZrO_3$.

Preferably, they comply with the formula:

$$Li_2\left(1-\frac{x}{3}\right)Zr\left(1-\frac{x}{3}\right)Cu_xO_3 \text{ with } 0 < x \leq 0.8.$$

6 Claims, 2 Drawing Sheets

COPPER-SUBSTITUTED, LITHIUM ZIRCONATE-BASED CERAMIC USABLE AS A TRITIUM PRODUCING MATERIAL

This application is a continuation of application Ser. No. 08/637,411, filed Apr. 24, 1996, now abandoned.

DESCRIPTION

The present invention relates to ceramic materials based on lithium zirconate, more particularly usable as a tritium producing material in all tritium producing devices, particularly for covering controlled nuclear fusion reactors.

Tritium producing materials usable in such reactors must in particular have the following characteristics:
1) stable at the reactor operating temperatures, generally 400° to 700° C.,
2) a suitable mechanical strength,
3) the production and release of tritium, which is produced by the nuclear reaction:

$$n+^6Li \rightarrow {}_1^3T + {}_2^4He,$$

4) stable under neutron radiation and
5) not give long-lived radioisotopes.

For this application, consideration has already been given to the use of ceramics based on lithium aluminate and lithium zirconate $Li_2ZrO_3$, as described by B. Rasneur in Advances in Ceramics, vol. 27, 1990, pp 63 to 76.

Stoichiometric lithium zirconate is one of the best materials usable for forming the covering of fusion reactors. It has adequate mechanical characteristics and a relatively low tritium release temperature. It is thermally stable and has a satisfactory behaviour under neutron radiation up to an 8% burnup fraction.

However, the consumption of lithium during irradiation, which could reach 10 to 20% of the lithium initially contained in the material in a commercial reactor, leads to a two-phase ceramic constituted both by zirconia and zirconate as a result of the transformation in accordance with the following diagram:

$$Li_2ZrO_3 + n \rightarrow Li_2ZrO_3 + ZrO_2 + T_2O \text{ (recovered)}.$$

The appearance of zirconia in the material is liable to embrittle the ceramic by deteriorating the cohesion of the grains forming it.

The present invention specifically relates to novel, lithium zirconate-based, ceramic materials making it possible to avoid such structural modifications during the consumption of the lithium.

According to the invention, the material is constituted by lithium zirconate substituted by copper in a quantity such that the material is in the form of a solid solution of type $Li_2ZrO_3$.

This substitution by copper makes it possible on the one hand to retain the structure of the lithium zirconate during lithium consumption and on the other improve the capacity of the ceramic on tritium release, by lowering the temperature at which the maximum tritium release occurs.

Other features and advantages of the invention will be better understood from the following description given in non-limitative manner and with reference to the attached drawings, wherein show:

FIG. 1 Part of the ternary diagram of the ceramic compositions $ZrO_2$, $Li_2O$ and $CuO$, around the area corresponding to the domain of solid solutions of type $Li_2ZrO_3$.

Figure 2:
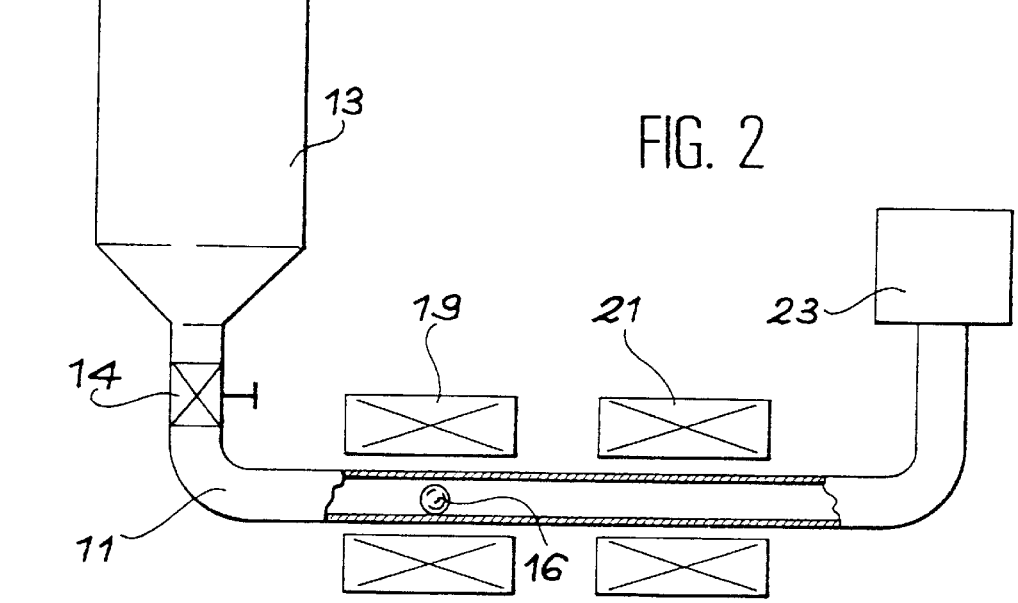

FIG. 2 Diagrammatically an installation for testing the properties of a ceramic material according to the invention with respect to tritium release.

Figure 3:
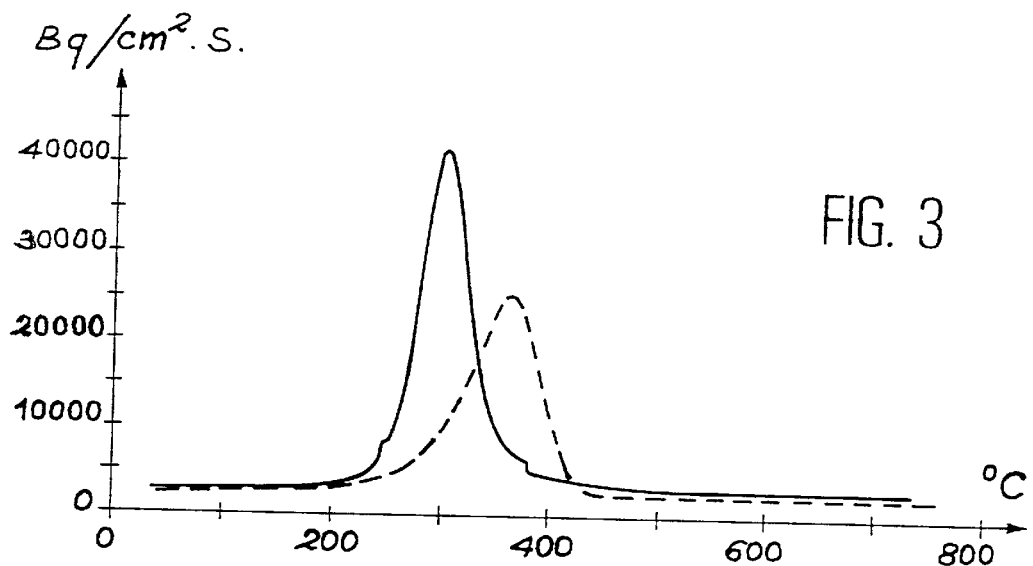
Figure 4:
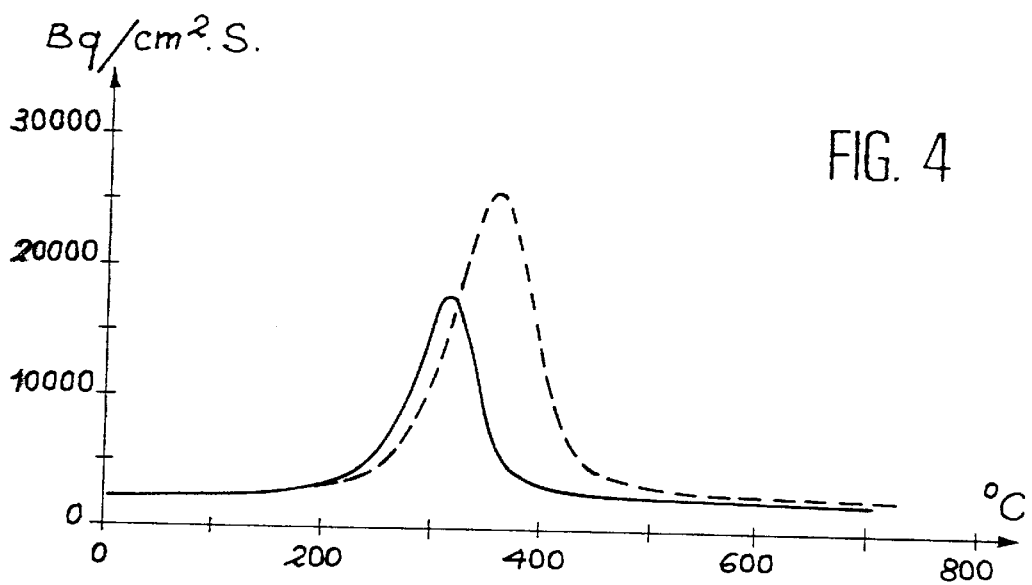

FIGS. 3 and 4 Graphs illustrating the released tritium flow as a function of the temperature in the case of two materials according to the invention.

FIG. 1 shows the area of interest in the ternary diagram of ceramic compositions incorporating $ZrO_2$, $CuO$ and $Li_2O$, which has the type $Li_2ZrO_3$ solid solution domain represented in the drawing by the hatched area.

In this diagram line 1 is the median or central line joining the apex CuO (not shown in the drawing) to the opposite side 2 of the ternary diagram, only part of said side being shown, namely that portion extending from 45 to 55% $Li_2O$.

In FIG. 1, line 1 corresponds to the substitution mechanism in which the same $Li_2O/ZrO_2$ ratio always occurs and which corresponds to the formula $$Li_{2(1-x/3)}Zr_{(1-x/3)}Cu_xO_3$$

The substitution mechanism is as follows:

$$\frac{2}{3} xLi^+ + \frac{1}{3} xZr^{4+} \rightarrow xCu^{2+}$$

Another substitution mode is represented by line 3 in FIG. 1 and corresponds to the formula:

$$Li_{2(1+x)}Zr_{(1-x)}M_xO_3$$

i.e. to the replacement of $xZrO_2$ by $x/2$ CuO and $xLi_2O$, i.e. the mechanism:

$$xZr^{4+} \rightarrow xCu^{2+} + 2xLi^+$$

It is a question here of the insertion of cations in the interstitial position.

Line 4 of FIG. 1 corresponds to the formula:

$$Li_{2(1-x)}Cu_xZrO_3$$

i.e. to the replacement of $Li_2O$ by CuO according to the mechanism:

$$2xLi^+ \rightarrow xCu^{2+} + x\square$$

The latter substitution leads to the creation of cation gaps in the structure, which is a prior favourable to cation mobility.

FIG. 1 shows that the substitution by $Cu^{2+}$ in the lithium zirconate structure leads to a relatively vast solid solution domain, because it extends up to x=0.08 on line 1, up to 0.06 on line 4 corresponding to the gap structure and to x=0.02 on the interstitial position substitution line 3.

In FIG. 1, the percent CuO ("z") and x are related as follows. First, the percent CuO is defined by the formula:

$$\% CuO = z = \frac{[CuO]}{[CuO] + [Li_2O] + [ZrO_2]} \times 100$$

Thus, for line 4 where $Li_{2(1-x)}Cu_xZrO_3$, the percent CuO is related to x as follows:

$$\% CuO = z = \frac{x}{x + (1-x) + 1} \times 100 = x/2$$

For line 1 where $Li_{2(1-x/3)}Zr_{(1-x/3)}Cu_xO_3$, the percent CuO is related to x as follows:

$$\% CuO = z = \frac{x}{x + (1-x/3) + (1-x/3)} \times 100 = x/(2 + x/3)$$

And for line 3 where $Li_{2(1+x)}Zr_{(1-x)}M_xO_3$, the percent CuO is related to x as follows:

$$\% \text{ CuO} = z = \frac{x}{x + (1 + x) + (1 - x)} \times 100 = x/2 + x.$$

Additionally, $x_i$ and $x_{supp}$ refer to x values of the formulas.

According to the invention, it is a priori possible to choose the composition of the ceramic material from anywhere within the solid solution domain shown, but preference is given to the use of a material with a composition on line 1, because these materials have interesting mechanical and microstructural characteristics (fine microstructure and mechanical strength of the same order of magnitude as that of unsubstituted zirconate).

During the irradiation of a ceramic material of this type, the consumption of lithium by the neutron reaction leads to a modification of the composition, which corresponds to a displacement towards the gap substitution line 4 (less lithium-rich compositions), said displacement being located on the line connecting the point illustrating the composition of the starting material with that corresponding to the apex of the ternary diagram ($Li_2O$) not shown in this drawing.

On using $x_i$ to designate the level of Cu in the starting ceramic (point A) on the median line 1 of FIG. 1 of the ternary diagram and designating by $x_{sup}$ the limit of the solid solution domain on said line 1, $x_i$ must then satisfy the relation $x_i \leq x_{sup}$ to ensure that the ceramic is in fact in the solid solution domain.

It has as its composition formula:

$$Li_{2(1-x/3)}Zr_{(1-x/3)}Cu_xO_3 \quad (A)$$

with $0 < x \leq 0.08$.

The consumption of lithium during irradiation will displace the point $A(x_i)$ on line 5 connecting A to the apex $Li_2O$ of the ternary diagram towards a limit value B located on the gap solid solution line 4. Therefore, at the end of the process, the ceramic will have the formula:

$$Li_{2(1-y_i)}ZrCu_{y_i}O_3 \quad (B)$$

in which $(1-y_i)$ designates the $Li_2O$ content at point B.

This passage from A to B takes place along the consumption line characterized by the ratio.

$$\frac{ZrO_2}{ZrO_2 + CuO} = \text{constant}.$$

The relation linking $x_i$ and $y_i$ is therefore given by:

$$\frac{1 - \frac{1}{3} x_i}{1 + \frac{2}{3} x_i} = \frac{1}{1 + y_i} \text{ i.e. } y_i = \frac{x_i}{1 - \frac{1}{2} x_i} \text{ or } x_i = \frac{y_i}{1 + \frac{1}{3} y_i}$$

Therefore the initial composition can be written as a function of $y_i$:

$$Li_2ZrCu_{y_i}O_{3+y_i} \quad (C)$$

The departure of the lithium by nuclear reaction can therefore be symbolized by the passage from a ceramic of composition $Li_2ZrCu_{y_i}O_{3+y_i}$ (C) to another material of formula: $Li_{2(1-y_i)}ZrCu_{y_i}O_3$ (B). It is then clear that the consumption of lithium takes place by the departure of $y_iLi_2O$.

In order to ensure the structural stability of the ceramic throughout the process, it is necessary for $y_i$ to be below $y_{sup}$, which limits the limiting solid solution substitution rate of line (4) of the ternary diagram. This relation then means that the initial substitution rate is such that:

$$x_i \leq \frac{y_{sup}}{1 + \frac{1}{3} y_{sup}} \leq x_{sup}.$$

Thus, the structural stability obtained by creating solid solution domains can be simplified in the case of a passage from the median line (1) of the ternary diagram to line (4) of the gap solid solution, so that the starting ceramic complies with the formula $Li_2ZrCu_yO_{3+y}$ with $0 < y \leq 0.06$.

The ceramic materials according to the invention can be prepared by conventional processes based on zirconium oxide, lithium carbonate and a copper salt such as copper nitrate.

When the ceramic material has a composition located on the central line 1 of the ternary diagram, preparation firstly takes place of a powder of lithium zirconate $Li_2ZrO_3$ using conventional processes and then the copper is introduced into said powder by impregnation by means of an ethanol solution containing a copper salt, e.g. copper nitrate. The treated powder then undergoes drying, baking and screening before being brought into the desired shape.

When the ceramic material composition is outside the central line 1, it is possible to start with a zirconia powder impregnated by a copper nitrate solution in ethanol and which is then subject to drying and baking, followed by the mixing of said zirconia powder containing the copper with lithium carbonate and the preparation of a zirconate powder using the conventional procedures of baking, screening, shaping and sintering.

In exemplified manner, a description is given hereinafter of two examples for preparing ceramic materials according to the invention.

EXAMPLE 1

Preparation of a Ceramic Material Incorporating 8% Cu

The starting product is a high purity zirconia only containing small hafnium traces comprising a neutron pick-up, which must be completely eliminated with a view to applications to nuclear fusion. The zirconia powder has a specific surface of approximately 15 $m_2/g$ and it is screened to 400 μm.

For the lithium, the starting product is a lithium carbonate with a specific surface of 1 to 1.5 $m_2/g$ and which is screened to 200 μm. The powders are then mixed by mechanical stirring for about 30 minutes and then the powder mixture is raised to 300° C. in 3 hours and is maintained at this temperature for 3 hours, before allowing to cool slowly to 100° C. After screening to 400 μm and further stirring, the same baking cycle is repeated at 700° C. These two baking cycles make it possible to bring about a complete decarbonation of the lithium carbonate and the synthesis of the $Li_2ZrO_3$ powder.

The powder then undergoes a further heat cycle involving stirring for 30 minutes and baking at 800° C. for 3 hours, which ensures a better integrity of the compact during sintering.

The thus obtained lithium zirconate powder is then impregnated with an ethanol solution containing 200 g/l of copper nitrate with contacting taking place for 30 minutes. The impregnated powder is then dried at 120° C. and baked at 800° C. for 3 hours, followed by screening to 400 μm.

This copper-containing powder is then brought into the form of ceramic bars in rubber sheaths having a diameter of 21 mm by compression in an isostatic press under a pressure of 300 MPa. After compression the sheath is eliminated and then the bars are sintered at 925° C. for 3 hours.

The thus obtained ceramic material complies with the formula:

$$Li_{1.94}Zr_{0.97}Cu_{0.08}O_3$$

and it has a porosity of 22% and an average grain size of 2 $\mu$m.

EXAMPLE 2

Preparation of a Ceramic Material Complying with the Formula $Li_2ZrCu_{0.05}O_{3.05}$ The operating procedure of example 1 is followed for the preparation of this material using for impregnation purposes a solution containing 200 g/l of copper nitrate and performing impregnation for 30 minutes.

The powder obtained complies with the above formula, having a porosity of 26% and a grain size of 1 $\mu$m.

EXAMPLE 3

(Comparison)

Lithium Zirconate Preparation

This example follows the operating procedure of example 1 for preparing a lithium zirconate bar, except that there are no impregnation, drying and baking stages prior to isostatic compression.

After sintering at 1000° C., lithium zirconate is obtained with a porosity of 27% and a grain size of 1 $\mu$m.

EXAMPLE 4

In this example the properties of the ceramic materials of examples 1 to 3 are tested with respect to tritium release.

On the basis of the ceramic bars obtained in these examples, using industrial machining under a stream of distilled water solid cylinders of equal height and diameter 3 mm are produced and these cylinders then undergo a wear operation on sand paper so as to obtain regular balls with a weight close to 50 mg.

Each ball is then introduced into quartz tubes and is degassed at 650° C. for 3 hours. The tubes are then filled with helium under 200 Torr (27 kPa), followed by sealing. The sealed tubes are then placed in aluminium containers able to in each case contain 12 tubes and each container is introduced into a nuclear reactor to subject the balls to an irradiation with a neutron flux of $2.5.10^{13}$ neutrons/cm$^2$.s in the centre of the container.

Therefore and with the container containing 12 tubes, the neutron flux value is effectively $2.5.10^{13}$ neutrons/cm$^2$.s in the centre of the aluminium container, but it is divided by two at its ends, where the irradiation only corresponds to a flux of $1.25.10^{13}$ neutrons/cm$^2$.s.

These irradiation conditions are relatively gentle so as not to give rise in the ceramic material to temperatures sufficiently high to bring about the in situ extraction of the tritium formed. Therefore most of the tritium remains confined prior to the release tests.

After 24 hours irradiation, the tubes are removed from the reactor and are allowed to cool for about 6 weeks in order to eliminate the intense radiation. The tubes then undergo a tritium release test in the device shown in FIG. 2.

This device comprises a quartz tube 11 connected at one of its ends to a loading device 13 provided with a tight cover 15, a tube/break device (not shown in the drawing) and a vector gas intake 17. The tube 11 traverses a first extraction furnace 19 and a second reducing furnace 21 and is connected at its other end to an ionization chamber 23. A valve 14 makes it possible to lock the ball in the tube 11 prior to its entry into the part corresponding to the furnaces 19 and 2.

The following test procedure is adopted. The quartz tube containing the irradiated ball is broken in the loading device 13. Therefore the tritiated gases are entrained in the circuit by the vector gas (helium with 0.1% hydrogen or helium alone) introduced at 17, whilst the ball remains locked by the grooved valve 14. The tritiated gases pass through the zinc reducing furnace 21 raised to a temperature of 370° C., where the tritiated water which may have been formed during the extraction is reduced to $T_2$ or HT. This reduction avoids any condensation risk on the walls of the pipes of the device, which would lead to a measurement by default of the released tritium quantities. The mixture constituted by the vector gas and the thus formed species then passes into the ionization chamber 23, which detects by counting the pairs ($He_+$, $e_-$) the tritium $\beta$ emission. This chamber makes it possible to follow at all times the tritium quantity in the vector gas.

Thus, with said first measurement determination takes place of the tritium quantity contained in the quartz tube prior to the extraction of the tritium contained in the sample ball. As soon as the ionization chamber signal has returned to its initial level, the ball is released by actuating the valve 14 so as to position it at 16 and it is introduced into the centre of the furnace 19, whose temperature is 35° C. for linear temperature gradient experiments.

The extracted gases are then entrained to the reducing furnace 21 and the ionization chamber 23, as described hereinbefore.

In the furnace 19, the ball 16 is subject to a linear temperature rise from 35° C. and with a heating rate of 1° C./min. This is followed by a measurement of the tritium quantity contained in the vector gas every minute.

FIG. 3 illustrates the results obtained in the case of the ceramic material of example 1 and the ceramic material $Li_2ZrO_3$ of comparative example 3.

In FIG. 3 the continuous line curve represents the results obtained with the 8% copper-doped lithium zirconate (example 1), whilst the broken line curve represents the result obtained in the case of stoichiometric lithium zirconate (example 3). These curves illustrate the tritium activity variations (in Bq/cm$_2$.s) as a function of the temperature (in °C.).

Thus, there is a considerable decrease in the tritium extraction temperature, which is 303° C. for 8% doped lithium zirconate instead of 359° C. for stoichiometric lithium zirconate.

Therefore the presence of copper improves the tritium release capacity of the ceramic.

FIG. 4 illustrates the results obtained for the ceramic material of example 2 and the stoichiometric lithium zirconate of comparative example 3.

In FIG. 4, the continuous line curve relates to the 5% Cu-doped lithium zirconate of example 2 and the broken line curve to $Li_2ZrO_3$ of comparative example 3.

FIG. 4 shows that the doping by 5% copper makes it possible to obtain a maximum release at a temperature of 315° C., which is well below the temperature of 352° C. for the stoichiometric lithium zirconate, namely a gain of 37° C.

The reduction is less pronounced than in the case of 8% copper-doped lithium zirconate, but the improvement is still clearly defined and the substitution by copper leads to a solid solution domain able to maintain the structural stability of the ceramic material during the consumption of lithium.

Therefore the ceramic materials according to the invention are very interesting for use as a tritium producing material, particularly in a thermo-nuclear fusion reactor, because they permit a recovery of the tritium at relatively low temperatures.

We claim:

1. Ceramic material constituted by lithium zirconate substituted by copper in a quantity such that the $Li_2O$, $ZrO_2$ and CuO composition is within the hatched area of the ternary diagram of FIG. 1 bounded by a straight line connecting a first point defined by the formula: $Li_{2(1-x/3)}Zr_{(1-x/3)}Cu_xO_3$, wherein x=0, to a second point defined by the formula: $Li_{2(1-x)}Cu_xZrO_3$, wherein x=0.06; a straight line connecting the second point to a third point defined by the formula: $Li_{2(1-x/3)}Zr_{(1-x/3)}Cu_xO_3$, wherein x=0.08; a straight line connecting the third point to a fourth point defined by the formula: $Li_{2(1+x)}Zr_{(1-x)}Cu_xO_3$ wherein x=0.02; and a straight line connecting the fourth point to the first point.

2. Material according to claim 1, characterized in that it complies with the formula:

$Li_{2(1-x)/3}Zr_{(1-x/3)}Cu_xO_3$ with $0<x\leq0.08$.

3. Material according to claim 1, characterized in that it complies with the formula:

$Li_2ZrCu_yO_{3+y}$ with $0<y\leq0.06$.

4. Tritium producing material for thermonuclear fusion reactor, characterized in that it comprises a ceramic material constituted by lithium zirconate substituted by copper in a quantity such that the $Li_2O$, $ZrO_2$ and CuO composition of the ceramic material is within the hatched area of the ternary diagram of FIG. 1 defined by a straight line connecting a first point defined by the formula: $Li_{2(1-x/3)}Zr_{(1-x/3)}Cu_xO_3$, wherein x=0, to a second point bounded by the formula: $Li_{2(1-x)}Cu_xZrO_3$, wherein x=0.06; a straight line connecting the second point to a third point defined by the formula: $Li_{2(1-x/3)}Zr_{(1-x/3)}Cu_xO_3$, wherein x=0.08; a straight line connecting the third point to a fourth point defined by the formula: $Li_{2(1+x)}Zr_{(1-x)}Cu_xO_3$ wherein x=0.02; and a straight line connecting the fourth point to the first point.

5. Tritium producing material according to claim 4, characterized in that the ceramic material complies with the formula:

$Li_{2(1-x)/3}Zr_{(1-x/3)}Cu_xO_3$ with $0<x\leq0.08$.

6. Tritium producing material according to claim 4, characterized in that the ceramic material complies with the formula:

$Li_2ZrCu_yO_{3+y}$ with $0<y\leq0.06$.

* * * * *